Nov. 6, 1962  A. BARBER, JR  3,062,946
METHODS AND APPARATUS FOR MANUFACTURE OF THERMAL BLANKETS
Filed April 19, 1957  3 Sheets—Sheet 1
FIG. 1.
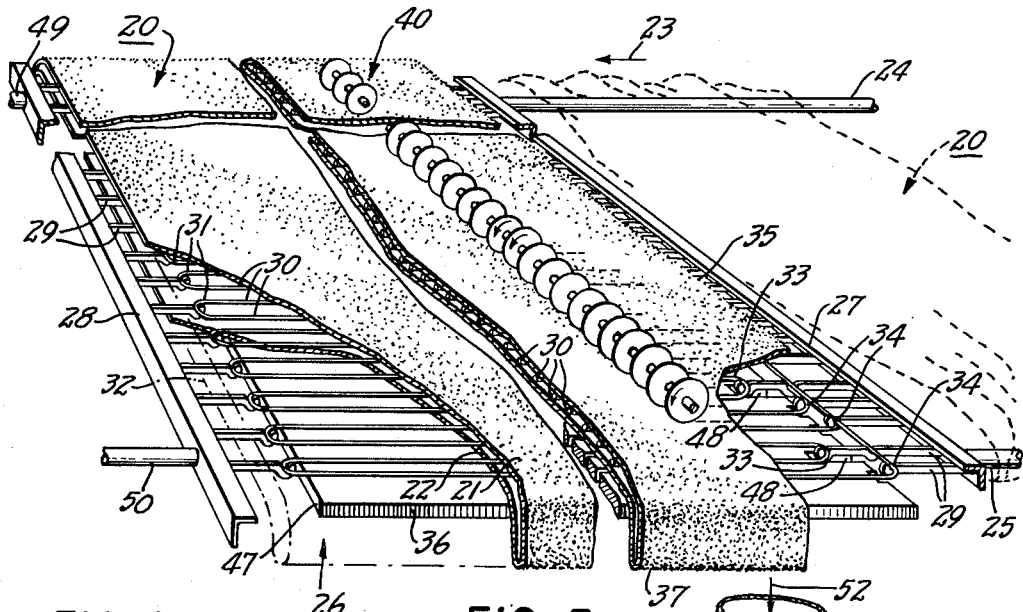
FIG. 2.
FIG. 3.
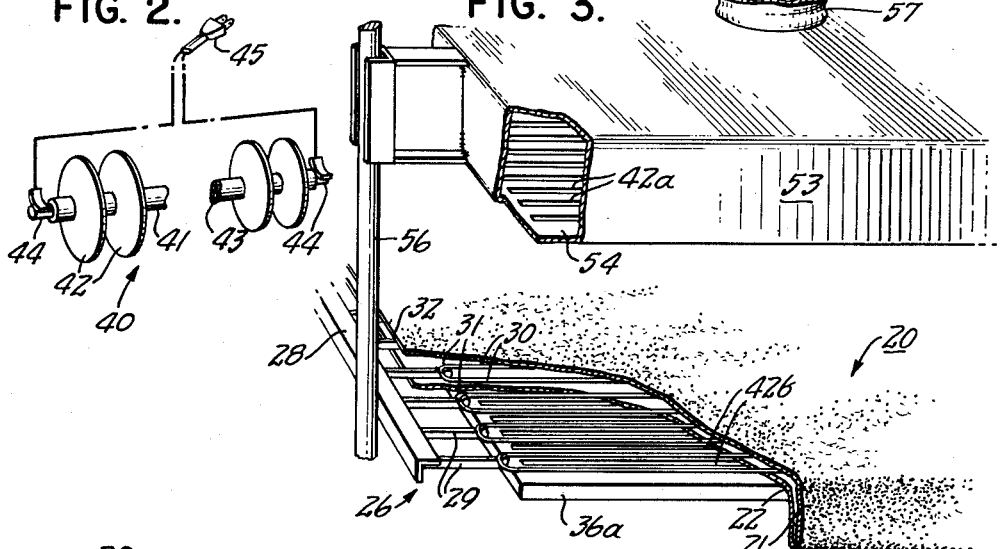
FIG. 4.
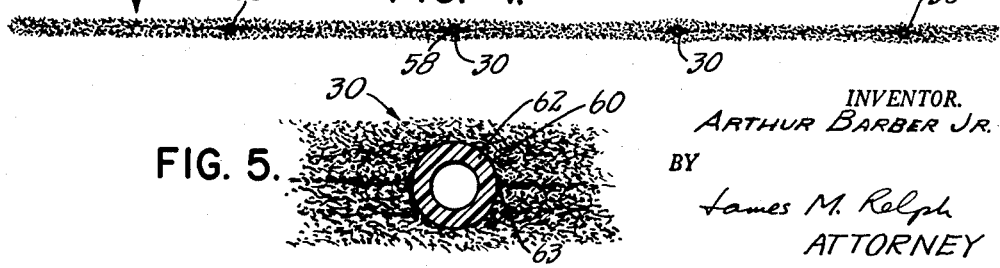
FIG. 5.
INVENTOR.
ARTHUR BARBER JR.
BY
James M. Relph
ATTORNEY INVENTOR
ARTHUR BARBER JR.
BY
James M. Relph
ATTORNEY

United States Patent Office 3,062,946
Patented Nov. 6, 1962

3,062,946
METHODS AND APPARATUS FOR MANUFACTURE OF THERMAL BLANKETS
Arthur Barber, Jr., Alpine, N.J., assignor to Jet-Heet, Inc., Englewood, N.J., a corporation of New York
Filed Apr. 19, 1957, Ser. No. 653,985
10 Claims. (Cl. 219—46)

The present invention relates to improved methods and apparatus for manufacture of thermal blankets of the type including flexible conducting elements adapted to control the blanket temperature as desired by the user. More particularly, the improved methods and apparatus of the present invention selectively join predetermined portions of and predetermined fibers of two or more layers of fabric material quickly and easily so as to assemble a suitable harness of flexible conducting elements in the blanket while maintaining an attractive appearance and pleasant fabric characteristics in the assembled blanket. In certain instances the surface of each of the flexible conducting elements is joined to selected fibers of one or more fabric layers.

In accordance with certain illustrative embodiments of the present invention described herein, predetermined fibers in the fabric material of the blanket are selectively responsive to predetermined steps of treatment for joining them together. Thus, these particular selectively responsive fibers in adjacent layers of fabric become joined together, while the other fibers remain separate from each other. As a result, two or more fabric layers are joined or laminated together and the resulting blanket has a highly desirable soft flexibility. For example, these fibers are heat-sealable, and the layers of fabric are joined together by heat applied to selected areas of the blanket lying between the positions of the flexible conducting elements. The heat is selectively applied by mechanical means or by suitably guided heated fluid.

In accordance with other illustrative embodiments of the present invention, predetermined fibers of the fabric material of the blanket are selectively responsive to predetermined applied fluids, for example, such as solvent liquids or vapors or adhesives for joining together or laminating two or more fabric layers with the harness of flexible conducting elements therebetween. Advantageously the surface material of the flexible conducting elements may be similarly responsive to the applied fluids and joined to selected fibers of the fabric.

Among the many advantages of the present invention are those resulting from the fact that it enables more ready assembly of thermal blankets utilizing pre-assembled harnesses of the flexible conducting elements. In many instances two or more continuous webs or layers of fabric material are enabled to be used in convenient step-by-step assembly methods. Any requirements for expensively pre-woven fabric panels with pockets for insertion of the various conducting elements are advantageously avoided.

As used herein the term "flexible conducting elements" is intended to include flexible capillary-sized tubing for conducting a suitable heat-transfer liquid as well as to include flexible insulated electrical conductors. There are advantages in the use of fluid conducting heat transfer elements, instead of electrical elements, both in assuring greatly increased safety and better control, and so the various specific embodiments of the present invention described herein are shown as including plastic tubing of small diameter for conducting a heated or a cooled liquid to maintain a comfortable body temperature for the user. The arrangement of the liquid circuits in such blankets is described in detail and claimed in a copending application Serial No. 633,213, filed January 9, 1957. Reference may be made to this copending application for details of the liquid circuits. Generally speaking, these circuits include main inlet and outlet header passageways near the center of one edge of the blanket, usually the foot edge, and small diameter plastic tubing provides a plurality of fluid-conducting circuits extending in parallel relationship between the inlet and outlet header passageways. These flexible liquid-conducting elements are arranged with portions of various elements substantially parallel to one another forming a heat-transfer grid extending throughout the main body of the blanket.

Prior to the present invention electrically heated blankets have been manufactured by weaving a double ply blanket fabric of the type shown in the Moberg Patent No. 2,203,918. During weaving the positions of various threads are interchanged to form ducts between the plies. This requires special setting up and control of the loom. Then, in a later operation the electrical conductors are individually threaded through the ducts formed by the weaving. Finally, the electrical harness is completed by interconnecting the various wires. Thus, the prior methods require elaborately controlled looms which are specially set up and considerable time and labor are involved in threading the individual conductors into place.

As explained in detail in the accompanying specification, this invention advantageously enables the use of completely pre-assembled harnesses of flexible conducting elements. These pre-assembled harnesses thus may be made efficiently on a mass production basis so as to save hand labor operations. These harnesses are then included in the blanket at the same time that the blanket itself is made in convenient step-by-step methods.

In certain illustrative embodiments of the present invention described herein, one or more fabric layers are woven in a continuous web or in a continuous tubular form and include a predetermined minority percentage of fibers, as to the total fiber content, selectively responsive to the steps utilized in assembling the fabric and harness together to form the completed blanket. In other illustrative embodiments the fabric webs or fabric in tubular form are non-woven and are held together or stabilized by a network or mesh of fibers which are arranged to adhere to one another so as to retain the non-woven fabric in the desired form. This non-woven fabric contains a predetermined percentage of fibers selectively responsive to the steps utilized in assembling the fabric and harness together. It is usually convenient to utilize the same fibers to form the stabilizing network or mesh as are used subsequently in interconnecting the various fabric layers of the completed blanket.

The present invention enables a substantial saving to be made in the hand operations previously required to assemble thermal blankets. Moreover, in many instances, this invention also enables considerable simplification in the manufacturing operations for making the fabric material which is to be used in the blankets.

In this specification and in the accompanying drawings, are described and shown various embodiments of the methods and apparatus of my invention and various modifications thereof are indicated, but it is to be understood that these are not intended to be exhaustive nor limiting of the invention, but on the contrary are given for purposes of illustration in order that others skilled in the art may fully understand the invention and the manner of applying the method and apparatus for manufacturing thermal blankets, and so that they may modify and adapt the invention in various forms, each as may be best suited to the conditions of a particular use.

The various advantages and objects of the present invention will be more fully understood from a consideration of the following specification in conjunction with the accompanying drawings, in which:

FIGURE 1 is a perspective view, shown partially broken away, illustrating method and apparatus embodying the present invention for manufacture of fabric blankets including a pre-arranged harness of flexible conducting elements;

FIGURE 2 is a perspective view, shown on enlarged scale, for explaining the operation of an electrically heated shaft and disc assembly shown in use in FIGURE 1 and utilized in a method for joining together selected portions of two fabric layers of a blanket with flexible conducting elements held therebetween;

FIGURE 3 is a partial perspective view illustrating a method wherein heated fluid or solvent vapor is used for joining together selected portions of two fabric layers of a blanket with a similarly pre-arranged harness of flexible conducting elements positioned within the blanket;

FIGURE 4 is a cross sectional view of a portion of a thermal blanket manufactured in accordance with the methods and apparatus of the present invention, with the section passing transversely through several of the flexible conducting elements. The scale of this drawing corresponds approximately with the actual dimensions in a blanket suitable for use on a bed;

FIGURE 5 is a cross sectional view, on further enlarged scale, of a portion of FIGURE 4;

Figure 6:
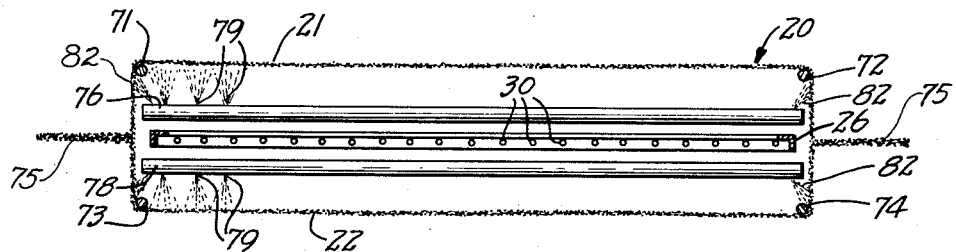
Figure 7:
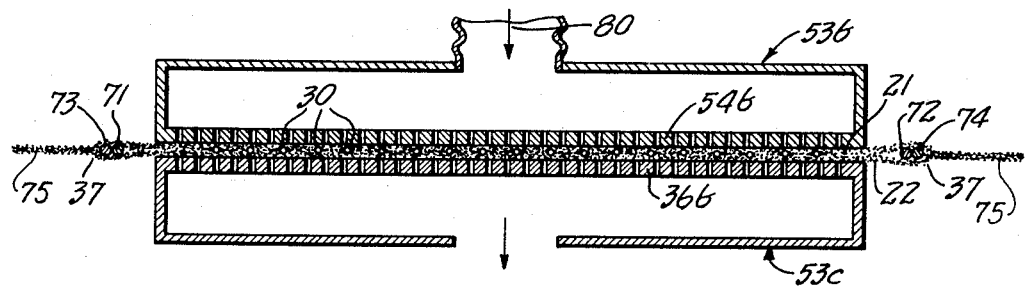
Figure 8:
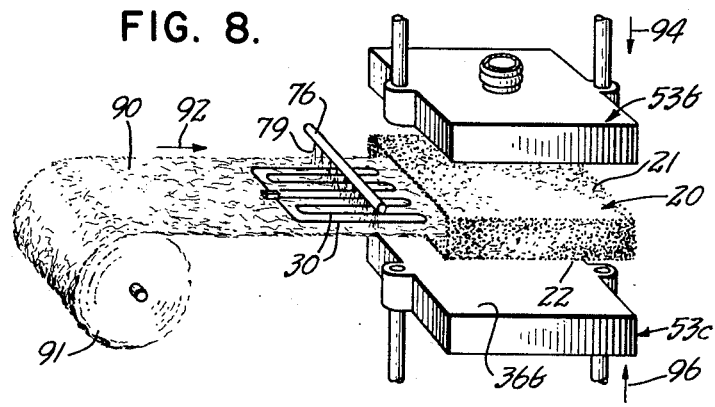
Figure 9:
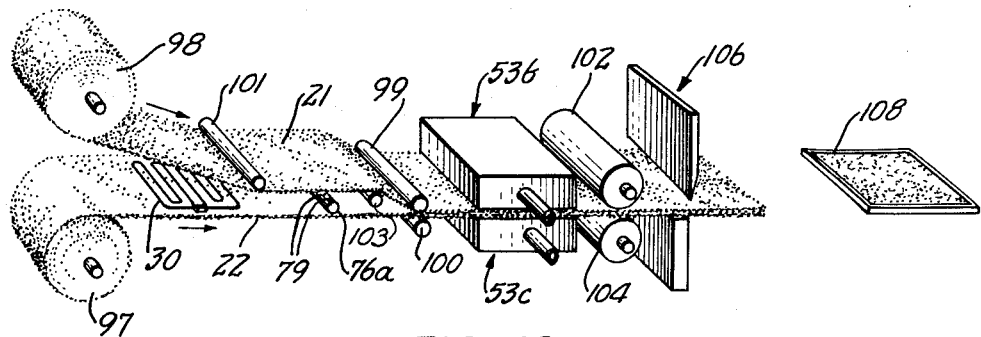
Figure 10:
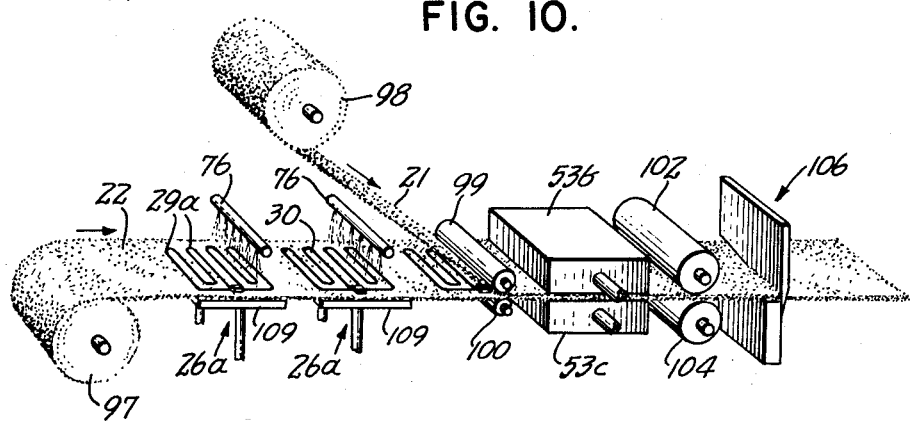
Figure 11:
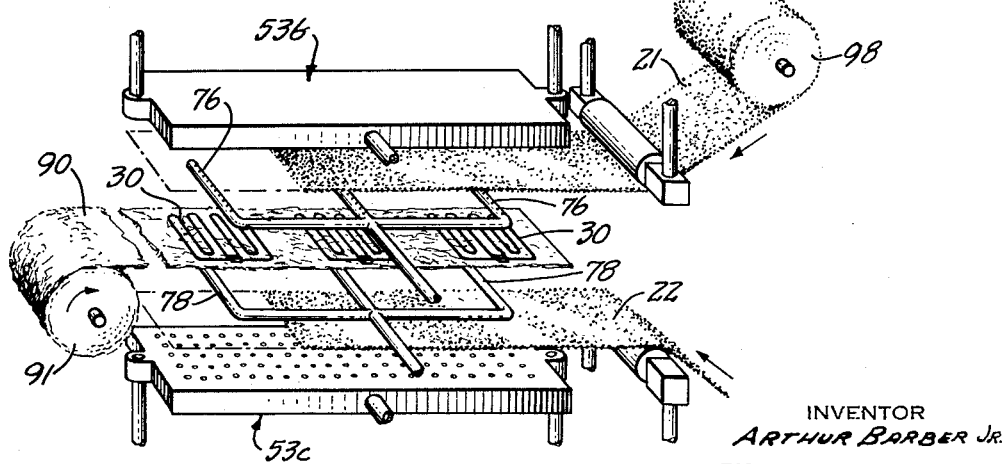

FIGURE 6 is a cross sectional view illustrating a method of and apparatus for assembling a tubular fabric material with a pre-arranged harness of flexible conducting elements enclosed therein, in accordance with one aspect of this method and apparatus an actuating fluid such as liquid solvent is applied for producing bonding, and in accordance with another aspect an inactivated bonding agent is applied in readiness for subsequent activation;

FIGURE 7 is a cross sectional view illustrating a further step in this method of FIGURE 6, and also FIGURE 7 illustrates a method of activating thermoplastic or soluble fibers contained in the fabric material for bonding the fabric and harness of conducting elements together;

FIGURE 8 is a partial perspective view schematically illustrating a thermal blanket assembly process embodying the present invention and wherein the harness of flexible conducting elements is supported by and joined to a stabilized web, in a manner as shown in FIGURE 5, and the web is fed into a tubular fabric material with the harness pre-positioned thereon;

FIGURE 9 is a simplified perspective view schematically illustrating another process for manufacture of a thermal blanket, the harness of flexible conducting elements being positioned on one of two continuous moving webs of fabric material, laminated therebetween, and then the assembled blanket being severed from the webs. Finally, the edges of the individual blankets are attractively bound;

FIGURE 10 is a simplified perspective view schematically illustrating a method similar to that of FIGURE 9 and wherein a plurality of pre-assembled harnesses are arranged upon one of the webs and initially secured thereto prior to lamination of the fabric layers; and FIGURE 11 illustrates a thermal blanket assembly method utilizing two rolls of fabric material with a stabilized web of fabric material fed into position therebetween and carrying a plurality of the harnesses of flexible conducting elements.

Referring to the drawings in greater detail, FIGURE 1 illustrates a fabric material 20 in tubular form and containing a predetermined percentage of fibers selectively responsive to subsequent steps in the assembly operation. In this embodiment of the invention heat is used to join selected portions of the two opposite sides or layers 21 and 22 of the tubular fabric together, and the selectively responsive fibers are heat-sealable. This fabric tube 20 is woven in tubular form from natural or synthetic fibers, for example, such as wool fibers, and contains a percentage of heat-sealable fibers. For example, it is desirable to use no more than 50% of the heat-sealable fibers, and in most instances I prefer to use a percentage content lying in a range from 10% to 40%, for heat sealing purposes. However, for solvent bonding action a somewhat different range is usually most effective, as described in detail further below. These heat-sealable fibers are staple plastic fibers which are mixed with the natural or synthetic fibers prior to the weaving. Preferably, these selectively-responsive fibers are added to and thoroughly intermixed with the natural or synthetic fibers during the carding operation prior to weaving. After weaving the tubular fabric is suitably "lofted" by means of comb-like fingers or teeth, in a "combing" or "brushing" operation such as is well known in the weaving art. This lofting provides a pleasing fluffy surface appearance and gives a soft "hand" or feel, characteristic of new wool blankets of good quality. As a result of these steps, the inner surfaces of the two layers 21 and 22 contain multitudes of fibers of which less than 50% are heat-sealable fibers. When the inner surfaces of these layers are also lofted all of the ends of the fibers extend inwardly to form a fluffy surface which aids in bonding together and in bonding to the conducting elements, as shown in FIGURES 4 and 5.

It is most advantageous to use staple thermoplastic fibers having ability to withstand temperatures at least 25° F. above the highest temperature to which the blanket is subjected in use without any detrimental effect, that is, to stand temperatures up to 160°. A copolymer of vinyl chloride-vinyl acetate, including 10% to 15% by weight of the vinyl acetate, and which is plasticized with tricresyl-phosphate or dioctyl-phthalate, has been found to work extremely well as the selectively responsive fibers in these blankets. This is heat-sealable at a temperature in the range from 170° F. to 175° F.

Nylon fibers may also be used in certain instances as the thermoplastic fiber content of the fabric and are suitably heat-bondable at 455° F. Monofilament polyethylene fibers are also suitable for the bonding fibers being satisfactorily bonded together at a temperature in the range between 230° F. and 250° F. However, for most purposes the vinyl chloride-vinyl acetate copolymer described above is most satisfactory.

In the embodiments of the invention utilizing solvent liquid or vapor for the purposes of bonding the fabric layers together or for purposes of bonding the conducting elements to the fabric layers, the following plastic fibers can be used to advantage in the fabric as the selectively responsive fibers:

Cellulose acetate fibers, which are soluble in ketones, esters, alcohols, phenol, and glacial acetic acid.

Nylon fibers, which are soluble in phenolic compounds.

Vinyl chloride-vinyl acetate copolymers, which are soluble in ketones, esters, and chlorinated hydrocarbons.

Acrylic staple fibers, sold under the trademark "Dynel" and soluble in acetone, and particularly soluble in the higher ketones, and in ethylene dichloride.

The fabric 20 is guided from the right, as indicated by the dotted outline and arrow 23 along a pair of guide rods 24 and 25. These guide rods also support one end of a harness pre-assembly rack 26 including a pair of cross members 27 and 28 with a plurality of inwardly extending fingers 29. These fingers have hooked notches at their inner ends for releasably supporting the U-shaped bends in the flexible liquid-conducting tubing elements 30. There are advantages in forming each tube, that is, each of the liquid-conducting circuits which is in parallel relationship with the others, so that it extends four times along the length of the blanket. Thus, each circuit includes three U-shaped bends and two right-angle bends where the opposite ends of the tube are brought back to the inlet and outlet header passageways. Two of the U-shaped bends 31 in each tube are positioned at the head end 32 of the blanket. The bends 31 of the various conducting elements 30 all lie along the same line, spaced downwardly a few inches from the binding which is secured along the top edge of the blanket. At the foot end of the blanket, intermediate portions of each conducting element have a U-shaped bend 33 spaced farther from the foot end of the blanket than the pairs of right-angle bends 34. These right angle bends are positioned where the various conducting elements turn and run back along near the foot edge 35 toward the center of that edge where they join the inlet and outlet headers.

As shown, the tubular fabric form is readily slid over the rack 26 on which the harness comprising all of the conducting elements 30 has previously been conveniently assembled. The tubular form lies generally flat, with the upper layer 21 passing over the conducting elements 30 held taut by the fingers 29. The lower layer 22 is supported on a flat work table 36 which can be raised relative to the fingers 29 for unhooking them. In most instances it is desirable to use a woven tubular fabric wherein the selvedges are woven together to form finished edges. In cases where a completely tubular form is used, opposite edges of the tubular fabric crease and form neatly rolled edges 37 which advantageously require no further finishing.

In order to join selected portions of the fabric layers 21 and 22 together, an electrically heated shaft and disc assembly 40 is used. This includes a rigid tubular axle 41 including a plurality of annular metal disc wheels 42 of good heat conducting metal, such as copper, secured on the axle, as by brazing, so as to be held rigidly in place and in good heat conducting relationship with the axle. An electrically insulated resistance element 43 extends through the bore of the axle, completing a circuit between a pair of wiping contacts 44 at each end suitably connected to a source of electrical power 45, diagrammatically illustrated. The heated wheels 42 are spaced apart a distance equal to the spaces between the parallel portions of the conducting elements 30 and are rolled along the blanket from one end to the other between the U-shaped bends 31 and 33. These partially melt the thermoplastic fibers causing them to join to corresponding fibers in the lower layer 22. As the heated wheels roll on, the heated areas between the elements 30 cool and become permanently bonded together, integrally forming pockets within the blanket holding the flexible elements 30 in place.

After the heat-bonding step, the work table 36 is raised relatively to the fingers 29. This lifts the lower layer 22, raising the harness elements 30, and releases them from the hooked notches. One edge 47 of the table just clears the ends of the fingers on the cross member 28. The other edge has spaced notches 48, providing clearance for the fingers on the cross member 27. Portions of the table 36 between these fingers continue to support the harness elements and assure that the assembled blanket can quickly be withdrawn from between the fingers 29 and then lifted up off from the table 36 without snagging.

In certain instances, instead of raising the table 36, it may be more convenient to lower the cross members 27 and 28 a short distance so as to release the elements 30. Movement of these cross members is controlled by the guide rods 24 and 25, and by a corresponding supporting structure including rods 49 and 50 secured to the other cross member 28. As a final step in finishing off the ends 32 and 35 of the blanket, attractive binding tapes are stitched in place.

In the method and apparatus of FIGURE 3, a heated fluid, illustrated as hot air or solvent vapor is used to join together the two fabric layers containing heat or solvent sensitive staple fibers 21 and 22. In FIGURE 3 and in the following figures, parts performing functions corresponding to those in FIGURE 1 have corresponding reference numbers and those performing similar functions have the same reference number with a letter suffix. The work table 36a has the same function of releasing the harness elements 30 from the fingers 29. As in the method and apparatus of FIGURES 1 and 2, the tubular fabric material 20 is slid in place over the harness assembly rack after the harness has been assembled on it.

For purposes of applying the heated fluid or solvent vapor 52 to the desired regions of the fabric layers 21 and 22, a manifold 53 in the form of a box having a slotted lower platen 54 is lowered on top of the fabric 20. Suitable guide means shown as an upright post 56 maintain the movable manifold 53 in alignment with the table 36a, and the slots 42a in the manifold overlie corresponding slots 42b in the table. The heated fluid or solvent vapor flows in through a flexible duct 57 having convoluted walls, and passes through the areas of the fabric layers 21 and 22 between the slots 42a and 42b. In effect, these pairs of slots acting together with the heated fluid or with the solvent vapor 52 are heat-bonding or solvent-bonding means joining selected areas of the blanket layers.

There are certain additional advantages to this method of FIGURE 3. For example, the various slots are made to differ in length at the foot end of the blanket. The shorter slots end within the bights of the U-bends 33. Those longer ones extend over adjacent to the right-angle bends 34 near the end of the blanket. Thus, all of the flexible elements are securely locked in place within blanket pockets. Moreover, these slots 42a and 42b may be made fairly wide so as to overlie all or substantially all of the area between the elements 30. In this way a major portion of the entire blanket is integrally bonded together, for example, as illustrated in FIGURES 4 and 5.

The resulting pockets 58 immediately surrounding the flexible elements 30 become relatively narrow and assure that these elements remain uniformly spaced and aligned within the blanket. This action is in marked contrast with those types of prior blankets which must contain large pockets so as to enable subsequent threading of the conducting elements through them. In these prior types of blankets there is considerable latitude for the flexible elements to shift around inside of the blanket.

In order to secure the conducting elements 30 even more firmly in place, these elements are provided with an outer coating 60 (please also see FIGURE 5) of the same material as used for the selectively responsive fibers or of another suitable material as described below. A convenient way to provide this coating for liquid-conducting elements is to form the walls 62 of the flexible tubing of suitable heat-bondable or solvent-bondable material. In the case of electrically conducting elements this bondable material is used as the insulation itself or as a coating applied over the insulation. When the surface coating on the conducting elements is of the same or similarly bondable material as these predetermined fabric fibers, the entire area of the fabric layers 21 and 22 and also the elements 30 can all be integrally joined together. In this case, it is desirable in many cases to replace the table 36a by a one-quarter inch mesh screen. Almost all of the bottom of the manifold 53 is then opened, and thus the hot air or solvent vapor 52 produces a bonding over substantially the full blanket area. Those selectively responsive fibers which lie adjacent to the surface 60 of the conducting element 30 become bonded thereto, as indicated at 63 in FIGURE 5, and extending around substantially the entire perimeter of the elements 30. Small narrow finger-shaped areas extending in from each end of the blanket are masked, so as to leave unbonded spaces from which the hooked ends of the fingers 29 are readily withdrawn.

Suitable materials for manufacturing conducting elements 30 in the form of extruded liquid-conducting tubing and extruded insulation tubing are listed below. In the case of liquid-conducting tubing it is particularly desirable to utilize plastic with a high resistance to vapor transmission through the tubing walls so as to prevent loss of circulating liquid over long periods of usage of the thermal blanket. Although, it is very easy to add liquid to the system, as will be understood by reference to the copending application mentioned above:

Copolymers of vinyl chloride-vinyl acetate, such as described above, are good materials for tubing being both heat-bondable and solvent-bondable, as described above.

Vinylidene chloride-vinyl chloride copolymers are another suitable material for tubing, being heat-bondable and having a high resistance to water vapor transmission.

Polyethylene extruded tubing is satisfactory, being heat-bondable at temperatures discussed above.

Certain rubber type resins also are suitable for tubing, being heat-bondable and also being bonded by organic solvents. These exhibit a high resistance to vapor transmission and are as follows: polyisobutylene, butyl rubber, vinyl nitril rubber, cyclised rubber, acrylonitril rubber, and butadiene-styrene.

Polymethyl-methacrylate tubing is suitable, being thermoplastic and bondable by partial dissolving in aromatic hydrocarbons.

In instances where a lower resistance to vapor transmission is acceptable, polyvinyl chloride tubing can be used. It exhibits relatively high tensile strength and is heat-bondable.

Instead of making the walls of the conducting elements of plastic responsive to certain bonding treatment, a coating layer of suitable plastic is applied. This use of a coating is usually a more desirable technique for insulated wires wherein it is usually safer to utilize an insulation material which is more or less inert to the bonding steps, and then to coat the inert insulation with the bondable plastic. This coating technique can also be used to advantage for coating plastic tubing such as discussed above, to enhance the bonding action. For example, it is an advantage when the tubing walls are of different material which is carried in or on the fabric iself. Suitable coating materials are:

Vinyl-acetate and methylacrylate resins, which are heat-bondable and are soluble in chlorinated hydrocarbons, aromatic hydrocarbons, esters, and ketones;

Ethylcellulose, which is heat-bondable and is soluble in alcohols, chlorinated solvents, esters, ketones, aromatic hydrocarbons, and nitro hydrocrabons;

Chlorinated rubber, which is heat-bondable and is soluble in chlorinated hydrocarbons, esters, ketones, and armoatic hydrocarbons;

Polyisobutylene resins, which are heat-bondable and soluble in aliphatic and aromatic hydrocarbons;

Polyamides, which are softened by heat and are solvent bonded by alcohols, and aromatic hydrocarbons.

Polyamide epoxy resins which are heat-sealable and soluble in alcohols, aromatic hydrocarbons, aliphatic hydrocarbons, and ketones;

Certain synthetic rubbers: polychloroprenes, butadiene-styrene, butadiene-acrylonitril, isoprene-isobutylene (butyl rubber), isoprene-styrene, polysulfite and polyacrylic rubber;

Silicone resins, which are solvent bonded by chlorinated hydrocarbons, esters, aromatic hydrocarbons, and aliphatic hydrocarbons;

Silicone rubber, which is solvent bonded by chlorinated hydrocarbons, aromatic hydrocarbons, and aliphatic hydrocarbons;

Styrene-butadiene resins, which are heat-bondable and are bonded by chlorinated solvents, aromatic and aliphatic hydrocarbons, and ketones;

Vinyl acetate, which is heat-bondable and bonded by these solvents: alcohols, chlorinated hydrocarbons, esters, aromatic hydrocarbons, ketones, and nitro hydrocarbons;

Vinyl acetate resins which are heat-bondable and soluble in alcohols, esters, and ketones;

Vinyl chloride-vinyl acetate copolymers as described above; and

Vinylidene chloride-acrylonitril resins, which are heat-bondable and soluble in ketones and chlorinated solvents.

After the blast of heated fluid or solvent vapor 52 is applied, the blanket is cooled or the solvent is driven off by an air blast to assure a good bond, and then the manifold 53 is raised. For speeding the cooling operation, a blast of cooler fluid is fed through the duct 57. For speeding extraction of solvent vapor, a stream of hot air is fed through the duct 57. Similarly, in the methods and apparatus of FIGURES 1 and 2, blasts of cooler air, such as air at ambient temperature, are used when desired to accelerate the cooling rate. As soon as the manifold is raised, the blanket is removed from the rack 26 and the two ends 32 and 35 are bound with tape as in the previous processes.

Before proceeding with a description of the other desirable methods and apparatus described herein, it should be noted that there are further advantages to the use of fabric layers having a predetermined percentage of fibers selectively responsive to the subsequent bonding steps. Only these fibers become joined together. The majority of the fibers in adjacent layers remain free of each other and can move independently of each other except where bonded by the selectively responsive fibers. Thus, after the various fabric layers have been joined together the blanket retains its freedom to roll softly and to stretch diagonally as are characteristic of blanket fabrics. The action of the fibers of the assembled blanket is distinct from a situation wherein all of the adjacent fibers of each layer are joined together, resulting in an unnatural stiffness in the blanket. In effect then, a lamination of selected regions in the interstices of the fabric layers is obtained by the above methods wherein only a predetermined percentage of the fibers in adjacent layers are bonded together in these regions.

By using a percentage of heat-bondable or solvent-responsive fibers falling in the range below 50%, as mentioned above, the desired strength of the assembled blanket is obtained together with the desired softness. I find that it is usually preferable to use as low a percentage of these fibers as possible while still retaining the desired blanket strength. The reasons for this are the greater cost of these fibers compared with wool. Also, the surface of the blanket has a somewhat softer and more pleasant "hand" or texture when the percentage of these fibers is lower, for example, from 20% to 35% is entirely satisfactory.

When using the methods and apparatus described in connection with FIGURE 3 wherein a substantial proportion of the total areas of the layers 21 and 22 are bonded together, the percentage of these fibers can efficiently be reduced from that required when only a relatively narrow bonded seam is formed by the wheels 42. For example, in a type of blanket wherein 35% of these heat-bondable or solvent-activated fibers are used with the method of FIGURE 1 or FIGURE 3, the percentage can be reduced to 25% when approximately one-half of the space between adjacent elements 30 is bonded together. When approximately two-thirds of the space between elements 30 is bonded together, the percentage can be reduced to 20%. With substantially the entire areas of the layers 21 and 22 bonded together by heat treatment or solvent vapor including the surface coating 60 on the elements 30, then the percentage may be reduced down to 10%.

Although the tubular fabric material has been described as woven, it can be a non-woven tubular web of material. Such a non-woven web is formed by blowing loose natural or synthetic fibers, e.g. wool, intermixed with the desired percentage of heat-bondable or solvent-bondable fibers onto a suitable form. To hold this web together, it is heated or solvent treated so that the bondable fibers join together throughout the fabric. These joined fibers form a network or mesh interlocking with all of the remaining fibers in the web. Then, later in the assembly stage, the fibers of this network which are near the surface of the adjacent fabric layer become bonded to the surface fibers in the corresponding network of the adjacent layer.

In the method and apparatus illustrated in FIGURES 6 and 7 a fluid is again used to provide the desired bonding. As shown, this fluid is a liquid solvent or solvent vapor for the selectively responsive fibers, the former may include some of the fiber material dissolved therein. For example, in the case of vinyl chloride-acetate copolymers as described above, the solvents used are aliphatic ketones such as methyl ethyl, ketone or acetone which may or may not include additional vinyl chloride-vinyl acetate copolymer dissolved therein.

The tubular fabric material 20, either woven or non-woven is initially supported on four movable control rods 71, 72, 73, and 74 spaced apart to define the corners of a rectangular area around the harness assembly rack 26. A pair of spray bars 76 and 78 having a length corresponding approximately with the width of the rack 26 are inserted within the fabric 20, one above and one below the rack. These spray tubes extend transversely of the rack and are connected by flexible hoses (not shown) to a source of solvent liquid or vapor or solution under pressure. Each spray tube includes numerous small orifices 79 therein directing a spray toward the inside surface of the adjacent fabric layer 21 or 22.

After traversing substantially the entire length of the fabric, the spray is turned off and these spray tubes are withdrawn. Then, the pairs of support rods at opposite sides of the blanket are brought together in the plane of the elements 30, as shown in FIGURE 7, so as to stretch the blanket out flat. A perforate supporting table 36b is brought up beneath the lower fabric layer 22 and a drying manifold 53b is lowered onto the upper layer 21. Thus, the two layers are held closely adjacent while the solvent partially dissolves the surfaces of the selectively responsive fibers causing them to stick together. To dry out the blanket by evaporating the solvent, a blast of air 80 is sent through from the manifold. Thereafter, the rods 71, 72, 73, and 74 are pulled out; elements 30 are unhooked from the fingers of the rack 26; and the blanket is withdrawn. Then, the ends of the blanket are bound up as before to finish it.

In order to bond the areas of the blanket near the edges 37, end sprays 82 are directed out from each end of the spray tubes 76 and 78. After the rods 71–74 have been removed, these edge portions 37 are also held flat between auxiliary pairs of flat plates, not shown, and allowed to dry. The selvedges 75 are shown in FIGURES 6 and 7 as being woven together in a maner well known in the electric blanket art.

By making the surface coating 60 or the elements 30 of the same material as the bondable fibers, or of solvent or heat bondable (responsive) material, the elements 30 become joined with each layer 21 and 22 and bond the entire blanket assembly as a complete unit, making a strong, washable, integral, flexible blanket wherein the conducting elements cannot shift in position.

Among the many advantages of using the solvent method of FIGURES 6 and 7 are those resulting from the fact that a lower percentage content of the selectively responsive fibers can be used, extending up from about 7%. Moreover, in certain cases, where a relatively concentrated solution of the fiber material dissolved in the solvent is used, the selectively responsive fibers in the blanket can be eliminated entirely, without unduly weakening the blanket structure, assuming that the bonding spray is applied over substantially the entire inner surfaces of the layers 21 and 22. As an example, when using a concentrated solution containing 40% to 50% by weight of the said copolymer of vinyl chloride-vinyl acetate dissolved in methyl ethyl ketone or acetone for the spraying step shown in FIGURE 6, then the percentage of selectivity responsive fibers in the fabric can be eliminated and still yield a satisfactorily strong blanket after assembly.

My theory for explaining the fact that the use of the solvent bonding action generally enables a lower percentage of selectively responsive fibers to be used than in the case of bonding by heat is as follows. The solvent partially dissolves the surfaces of all of these plastic fibers causing adjacent ones firmly to join together, in spite of the fact some of them may only lightly touch one another. Heat bonding requires a somewhat higher pressure between adjacent fibers in order for their softened surfaces firmly to unite. Thus, for a given percentage content of the plastic fibers in the fabric layers 21 and 22, more individual interconnections between fibers are obtained by using solvent action.

When dissolved plastic is also included in the solvent, there is a tendency to build up a coating on the blanket fibers and elements as the solvent evaporates. In this way, the precipitated plastic bridges the blanket webs and elements as the solvent evaporates. As a result, a large number of interconnections are obtained.

When non-woven fabric is used, the network or mesh of the interconnected fibers holding the fabric web together can also be formed by applying solvent or solvent containing dissolved plastic to the bat of fibers after it has been deposited.

As between the bonding action obtained by heat and the bonding action obtained by solvent or solvent plus dissolved plastic, my preference is for the latter methods and apparatus, because of lower percentage of the bondable fibers can usually be used. Also, the bonding liquid or vapor is sprayed or blown directly upon the inner surfaces of the blanket, so that the outer surface of the assembled blanket retains a softer, more pleasant "hand."

The remaining FIGURES 8–11 show methods and apparatus utilizing bonding liquid or vapor. In the method of FIGURE 8, the pre-assembled harness of flexible conducting elements 30 is laid in place upon a stabilized non-woven web 90. The web 90 includes readily soluble plastic fibers. For ease in holding this harness in place, a rack (not shown) is positioned beneath the web 90. This rack includes pins (such as shown in FIGURE 10) projecting up through the web to hold the U-shaped bends and right-angle bends of the flexible elements in place. The coating 60 of these elements or the surface of the elements themselves, is responsive to a bonding spray 79 of solvent liquid or vapor applied from a spray tube 76 which is passed over the harness. A substantial amount of this spray is applied so as to soak the part of the web 90 near the harness. In certain instances the corresponding underside of the web 90 may also be sprayed as by a spray tube, not shown.

Then, the rack is withdrawn and the web is further unrolled from a supply roll 91 and moved to the right so that the portion of the web carrying the harness is fed into the tubular fabric 20, as indicated by the arrow 92. This fabric is supported by four rods in a manner similar to those shown at 71–74 above. Because the web 90 is thoroughly soaked, the inner surfaces of fabric layers 21 and 22 are wetted when the manifold 53b and supporting surface 36b are closed against the fabric as indicated by the arrows 94 and 96. After a brief pause in the closed position, a blast of the air is fed through to evaporate the solvent. The two ends of the assembled blanket are suitably bound after the blanket is removed from the drying step.

The stabilized web 90 is extremely tenuous, being as light in weight as possible, while still having sufficient strength to carry the harness. It is a nonwoven web including approximately the same proportion of bondable plastic fibers as in the tubular fabric 20.

In certain instances where solvent vapor is used, the function of the spray tube 76 can be performed by the chamber 53b. Solvent vapor is blown through the web 90 near the harness 30 positioned between the chambers 53b and 53c so as to soften the responsive fibers of the web 90 near the harness. This bonds the fabric layers 21 and 22 and the web 90 together and holds the elements in place.

By utilizing a web 90 having a relatively high content of solvent-responsive fibers, the spray bar 76 can be eliminated. The fabric tube is supported on four rods in the manner similar to those shown at 71, 74 above. Then, the manifold 53d and support surface 36b are closed against the fabric as indicated by arrows 94 and 96 and solvent vapor is passed through the blanket assembly. Bonding takes place across the entire inner surface of the blanket and assembled elements because of the partial dissolving of the fiber web. After a brief interval in the closed position a blast of air is fed through to evaporate the solvent. The two ends of the assembled blanket are suitably bound with satin tape after the blanket is removed from the drying step.

In effect, in one of the methods of FIGURE 6 plastic for bonding is applied or introduced in solution in the spray 79 and produces the bonding as the solvent evaporates. This may be applied to a fabric containing only inert fibers. Alternatively, the plastic may be later activated by partially redissolving and softening by solvent liquid or vapor or by applied heat. In effect, in one of the methods of FIGURE 8, the plastic for bonding is applied or introduced as a web 90 and produces the bonding action by later actuation by solvent liquid or vapor or by applied heat.

In the process of FIGURE 9, the pre-assembled harness of elements 30 is placed upon a lower web 22 as it is unrolled from a supply roll 97 and moves continuously or intermittently to the right. An upper web 21 is unrolled from the roll 98. A spray 79 of the bonding liquid or solvent vapor or liquid (in cases where solvent sensitive fibers are included in web material) is subsequently applied by a double spray tube 76a having orifices directed both upwardly and downwardly. The hold-down roller 101 and guide roller 103 maintain the upper web 21 parallel and close to the lower web as they both pass near to the spray tube 76a. The webs 21 and 22 are then pressed together about the harness 30 by a pair of co-operating press rollers 99 and 100.

A pair of manifolds 53b and 53c sends blasts of air through the laminated fabric first in one direction and then in the other to dry it out. Then the laminated webs 21 and 22 pass between the draw rolls 102 and 104, and a cutting knife, as indicated diagrammatically at 106, cuts off the assembled blanket. Subsequently, a binding 108 is applied along all four edges of the blanket.

The process of FIGURE 10 is generally similar to that of FIGURE 9 except that the motion of the webs 21 and 22 is intermittent and the movement between stops equals a plurality of blanket lengths. A plurality of the pre-assembled harnesses are laid in place upon the lower web at the same time. A rack 26a, such as discussed above in connection with FIGURE 8 is positioned beneath each harness loading position along the production line. Each rack includes a movable table 109 including a plurality of upstanding pin-like fingers 29a which pierce through the fabric layer positions to hold the bends of the flexible elements 30 in place.

Bonding spray is applied from the spray bars 76 after the harnesses are in place. After a brief period tables 109 are lowered to withdraw the fingers 29a. The webs 21 and 22 are both advanced to the right by a distance equal to a plurality of blanket-lengths. Then, the tables 109 are again raised and the next group of harnesses are laid in place over the fingers 29a.

The process of FIGURE 11 is similar in certain respects to both FIGURES 8 and 10. The pre-assembled harnesses of elements 30 are loaded onto a stabilized web 90 at positions off to the left of the main assembly stage, as diagrammatically indicated by the break shown in this web 90. A lightly applied bonding spray, not shown, is used to secure the harnesses in place on the web 90. Loading racks, not shown, similar to those at 26a may be used to advantage.

As soon as a plurality of these harnesses are in place, the web 90 is advanced into position between the manifolds 53b and 53c. Bonding spray is again applied, this time to the underside of the upper layer 21 by a plurality of spray tubes 76, which operate as this layer 21 is fed in from the right. Similarily, a plurality of spray tubes 78 apply liquid to the upper surface of the layer 22 as it is fed into place. Then, the manifolds 53b and c are closed and held briefly. Air blasts are applied in sequence in both directions. When it is dried, the manifolds are separated from the fabric and the individual blankets are cut apart. Finally, their four edges are bound as before.

Although wool fibers are extremely satisfactory others such as cotton or linen may be used as the non-responsive fibers, the important considerations being durability for use in a blanket fabric and avoidance of any significant response to the bonding steps. Instead of the use of vinyl copolymers, polyethylene fibers can be used as the heat-sealable ones.

From the foregoing it will be understood that the methods and apparatus embodying the present invention described above are well suited to provide the advantages set forth, and since many possible embodiments may be made of the various features of this invention and as the method and apparatus herein described may be varied in parts, all without departing from the scope of the invention, it is to be understood that all matter hereinbefore set forth or shown in the accompanying drawings is to be interpreted as illustrative and that in certain instances, some of the features of the invention may be used without a corresponding use of other features, all without departing from the scope of the invention.

What is claimed is:

1. An improved soft, flexible thermal blanket including a plurality of spaced parallel portions of flexible conducting elements, said blanket having freedom to roll softly in use, said blanket comprising two superposed flexible fabric layers each composed of fibers a minority percentage of which are softenable, said conducting elements being disposed between said fabric layers, and said layers being bonded together at their adjacent surfaces by fusion between said softenable fibers, said conducting elements being held in their relatively fixed positions between the bonded surfaces of the flexible fabric layers.

2. An improved flexible thermal blanket including a plurality of spaced parallel portions of flexible conducting elements and having a soft texture, said blanket comprising two superposed flexible fabric layers each composed of fibers a minority percentage of which are softenable, said conducting elements being disposed between said fabric layers, and said softenable fibers in said layers being integral with each other at the adjacent surfaces of said layers to provide a bond between said layers, said conducting elements being held in their reltaively fixed positions between said bonded portions of the flexible fabric layers.

3. An improved flexible thermal blanket as claimed in claim 2 and wherein the surface of said flexible conducting elements includes material similar to the material of said softenable fibers, and wherein said softenable fibers are fused with said surface material at points of contact between said elements and said fabric layers.

4. Method of manufacturing a soft, flexible thermal blanket comprising the steps of pre-assembling a plurality of flexible conducting elements into a harness of parallel elements connected by U-bends, supporting said harness at said U-bends with said parallel elements extending unsupported therebetween, inserting the said pre-assembled harness between the layers of a flat, tubular fabric fibrous form, a minority percentage of the fibers being softenable, bonding together between said parallel elements said softenable fibers in the adjacent surfaces of said fabric layers, and releasing said harness to lease said elements positioned between said layers and held in position by the bonding together of said minority percentage of fibers in said adjacent surfaces.

5. The method defined in claim 4, wherein said bonding is effected by exposing substantially the entire area of said fabric between said elements to a solvent fluid, said minority percentage of fibers in said fabric being soluble in said solvent fluid and the remaining percentage of fibers in said fabric being insoluble in said solvent fluid, and subjecting said exposed area to a solvent-extraction treatment.

6. The method defined in claim 4, wherein said bonding is effected by heating said fabric between said elements, said minority percentage of fibers in said fabric being softenable by heating and the remaining percentage of said fibers in said fabric being unaffected by heat.

7. The method defined in claim 4, wherein during said bonding step the surfaces of said flexible elements are bonded to a minority percentage of the fibers in the adjacent surfaces of said fabric layers.

8. The method defined in claim 4, wherein substantially the entire area of said fabric between said elements is bonded, and wherein said minority percentage of fibers in said fabric is less than 10%.

9. Method of manufacturing a flexible thermal blanket having a soft texture and adapted to roll freely in use comprising the steps of pre-assembling a plurality of flexible conducting elements into a harness of parallel elements connected by U-bends, distending a tubular fabric fibrous form wherein a minor percentage of the fibers are solvent softenable into a substantially rectangular shape, inserting said pre-assembled harness between the layers of said tubular fabric form, treating the inner surfaces of the upper and lower portions of said form with a solvent fluid, the minority percentage of fibers in said fabric being soluble in said solvent fluid and the remaining percentage of fibers in said fabric being insoluble in said fluid, collapsing said distended fabric to bring said upper and lower layers into contact with each other, and drying said fabric to remove said solvent therefrom for bonding together said upper and lower fabric layers with said conducting elements therebetween and holding said conducting elements in their relatively fixed positions between said bonded fabric layers.

10. The method defined in claim 9, wherein said pre-assembled harness is placed on and bonded to a fabric web prior to insertion between said fabric layers, said web including fibers that are soluble in said solvent fluid.

References Cited in the file of this patent

UNITED STATES PATENTS

| | | |
|---|---|---|
| 1,749,159 | Respress | Mar. 4, 1930 |
| 1,903,960 | Dreyfus | Apr. 18, 1933 |
| 2,281,646 | Whitehead | May 5, 1942 |
| 2,465,348 | Boehm et al. | Mar. 29, 1949 |
| 2,500,282 | Francis | Mar. 14, 1950 |
| 2,503,024 | Boese et al. | Apr. 4, 1950 |
| 2,512,875 | Reynolds | June 27, 1950 |
| 2,538,899 | Dodge et al. | Jan. 23, 1951 |
| 2,548,467 | Crise | Apr. 10, 1951 |
| 2,573,455 | Koontz | Oct. 30, 1951 |
| 2,582,132 | Kaphan | Jan. 8, 1952 |
| 2,582,479 | Clark | Jan. 15, 1952 |
| 2,674,683 | Rand | Apr. 6, 1954 |
| 2,771,537 | Lichtenstein | Nov. 20, 1956 |
| 2,862,097 | Negromanti | Nov. 25, 1958 |

UNITED STATES PATENT OFFICE
CERTIFICATE OF CORRECTION

Patent No. 3,062,946                                      November 6, 1962

Arthur Barber, Jr.

It is hereby certified that error appears in the above numbered patent requiring correction and that the said Letters Patent should read as corrected below.

Column 7, line 37, for "iself" read -- itself --; column 10, line 1, for "selectivity" read -- selectively --; column 11, line 63, after "layer" insert -- in --; line 66, after "period" insert -- the --; column 12, line 31, after "in" insert -- various --.

Signed and sealed this 7th day of May 1963.

(SEAL)
Attest:

ERNEST W. SWIDER                                       DAVID L. LADD
Attesting Officer                                          Commissioner of Patents